United States Patent

[11] 3,569,828

| | | |
|---|---|---|
| [72] | Inventor | Borg Bernsen<br>Sacramento, Calif. |
| [21] | Appl. No. | 719,029 |
| [22] | Filed | Apr. 5, 1968 |
| [45] | Patented | Mar. 9, 1971 |
| [73] | Assignee | The United States of America as represented by the Administrator of the National Aeronautics and Space Administration |

[54] ELECTRICAL APPARATUS FOR DETECTION OF THERMAL DECOMPOSITION OF INSULATION
8 Claims, 3 Drawing Figs.

[52] U.S. Cl. .................................................... 324/65;
60/35.6; 174/110.3; 340/227
[51] Int. Cl. ...................................................... G01n 27/02
[50] Field of Search ........................................... 324/54.6
(S), 71 (E); 340/227, 227.1, 228; 102/98; 60/35.6
(RS); 174/110.3, 110.42, 120.3, 121.3; 161/208

[56] References Cited
UNITED STATES PATENTS
2,165,738  7/1939  Van Hoffen .................. 174/110.3
OTHER REFERENCES
Turner R. P. MICROFARAD METERS IN RADIO NEWS Dec. 1945 PP 46, 47, 144— 147

*Primary Examiner* — Edward E. Kubasiewicz
*Attorneys* — G. T. McCoy, Leon D. Wofford, Jr., and Joseph Beumer

ABSTRACT: This invention comprises an article of manufacture made up of alternating layers of electrically conductive rubber and electrically nonconductive rubber with power supplied to each of the electrically conductive rubber layers and a means for measuring any change in the rate of flow of electric current between any two electrically conductive rubber layers. This article is useful as a detector for thermal decomposition of insulation. This invention also includes the use of the subject apparatus, especially in rocket engines.

PATENTED MAR 9 1971 3,569,828

INVENTOR.
BORG BERNSEN
BY Edward O. Ansell
William E. Hiller
ATTORNEYS

ELECTRICAL APPARATUS FOR DETECTION OF THERMAL DECOMPOSITION OF INSULATION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This invention comprises a detector for failure in a solid propellant rocket motor in the insulation which separates the cured propellant grain from the rocket case or shell. More particularly, this invention comprises a detector which is positioned in the subject insulation surrounding the grain and which consists of two or more electrically conductive layers, each pair of which is separated by a relatively nonconductive layer whereby a burn through one conductive layer and the adjacent nonconductive layer substantially reduces the resistance between the burned conductive layer and the next conductive layer, thereby giving warning of failure of insulation at least between the grain and the detector.

The science of rocket propulsion is generally divided into two separate areas, one dealing with liquid or liquefied propellants and the other dealing with solid propellants. The liquid propellant systems have become highly sophisticated, allowing a maximum of control in the case of either proper function or malfunction of the rocket engine. In a liquid propellant rocket engine the combustion takes place outside the fuel storage tanks in a combustion chamber. In the case of a malfunction, it is possible to cut off the flow of fuel and/or jettison the malfunctioning stage. The major drawbacks in the use of liquid fuels are first, the time necessary to prepare a rocket for launching and, second, the problem of fuel leakage.

Rockets using solid propellant rocket motors require no time for preparation for launching and do not generate leakage problems. However, solid propellant rocket motors develop their thrust by the combustion of the cured propellant grain at the grain surface inside the rocket motor. One of the causes of failure in solid propellant rocket motors is burn-through of the insulation separating the grain from the rocket shell. Under such circumstances, a rocket becomes extremely erratic at best and generally explodes due to failure of the outside shell. This type of failure has adversely affected the further development and use of rocket motors especially where the rocket would be expected to carry passengers. Heretofore, there has been no way of telling when a malfunction would occur in a solid propellant rocket motor as a result of burn-through of the internal insulation. Rocket cases or shells are usually fabricated from materials, such as special alloys or resin-fiberglass compositions, designed to maintain their physical properties up to about 300° F. Consequently, when the temperature of a case or shell exceeds such temperature, failure of the case or shell is possible as by a blow out, resulting in a catastrophic failure. In order to consider the use of solid propellant rocket motors for passenger-carrying rockets, there must be some method of warning the passengers that the rocket motor may explode due to the insulation failure. Even on rockets which carry payloads other than passengers, it is necessary to have some type of malfunction detector to enable someone controlling the rocket to shut down the malfunctioning stage, to jettison the payload or the defective stage or to select an alternate mission for the rocket.

One of the objects of this invention is to provide a detector for the failure of internal insulation in solid propellant rocket motors. Another object of this invention is to provide a simple detection system for such malfunctions whereby multiple warnings are possible. Another object is to provide such a detection system which is capable of functioning in such a manner as to trigger a mechanism, for example, to sound an alarm, to jettison a payload or to shut down the malfunctioning stage. These objects, as well as others which are apparent from the following description, are satisfied by this invention.

This invention comprises an apparatus for detecting thermal decomposition of a thermal insulation medium comprising: a thermal insulation medium; a source of thermal decomposition of said medium, said source and said medium being of such a nature that the path of decomposition through said medium is more electrically conductive than said medium prior to decomposition; a first means positioned uniformly within said medium with respect to said source, said first source means being more electrically conductive than said medium with respect to electrical conduction through said medium in a direction from said source to said first means; a second means positioned uniformly within said medium with respect to both said source and said first means, said second means being separate and more remote from said source than said first means, said first means, said second means being more electrically conductive than said medium with respect to electrical conduction through said medium in a direction from said first means to said second means; and electric power supply means attached to said first and second means; and a means for the measurement of change in the rate of flow of electric current between said first means and said second means through said medium.

Preferably, this invention comprises a three layer detection element covering continuously any area for which protection is desired such as, for example, either of the rocket motor heads or the cylindrical portion of the motor or any particular limited area depending on the mission for which the rocket is designed. The detection element is positioned within the insulation separating the grain from the rocket motor case. The three layers consist of two electrically conductive layers separated by a relatively electrically nonconductive layer. Failure in one conductive layer and in the nonconductive layer results in a readily detectable reduction in the difference in induced electrical potential between said conductive layers or in the resistance to the flow of electric current between said conductive layers or, alternatively, a readily detectable increase in the flow of current between said conductive layers.

For a better understanding of this invention, references made to the drawings are submitted herewith.

Figure 1:
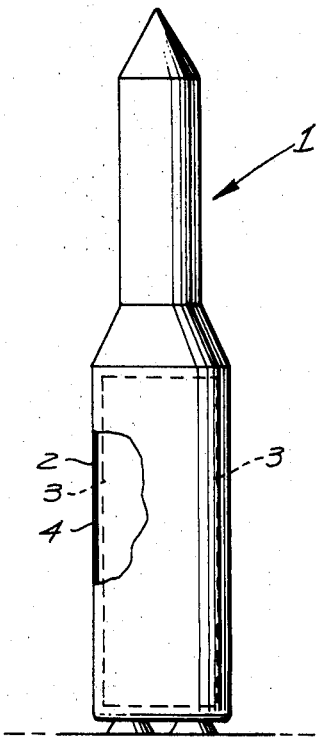
FIG. 1 depicts on a much reduced scale a typical rocket employing a solid propellant rocket motor.

In FIG. 1, a typical rocket 1 employing a solid propellant rocket motor comprises an alloy shell 2 containing a grain of cured propellant 3. The grain and shell are separated by an insulating layer 4. The scale in FIG. 1 is such that 1 inch equals approximately 5 feet.

Figure 2:
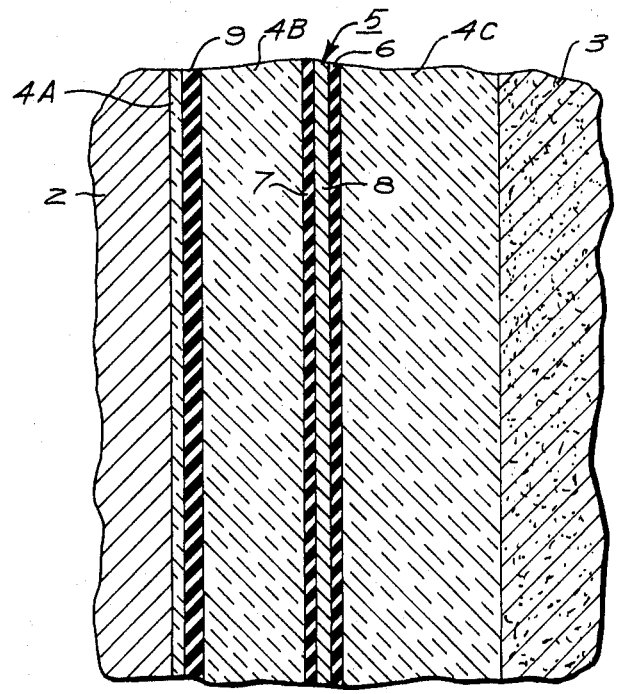
FIG. 2 is an enlargement of the section shown in FIG. 1.
Figure 3:
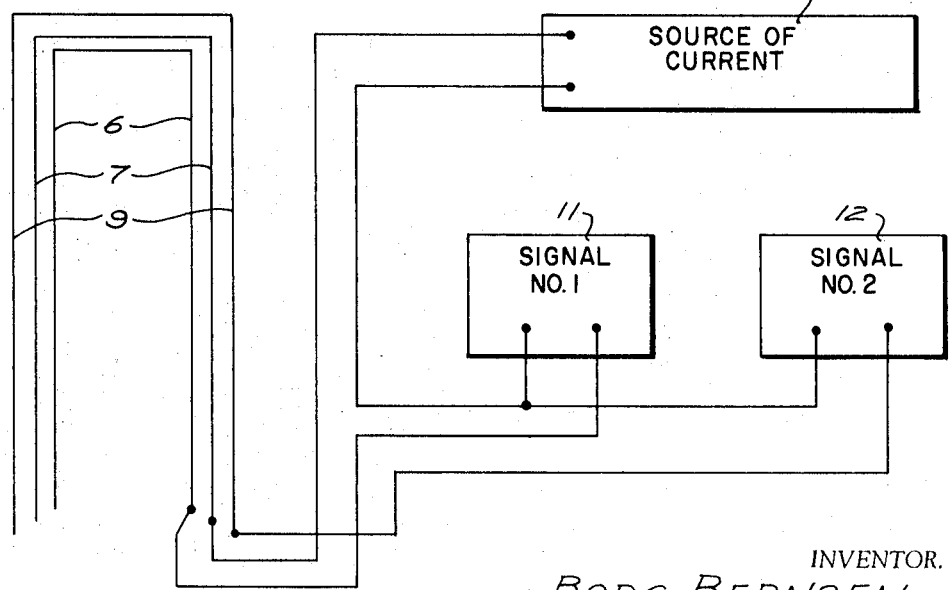
FIG. 3 is a simple circuit diagram.

FIG. 2 represents a cutout section of FIG. 1. This section is approximately three times actual size. In this section, the alloy shell 2 of the rocket 1 is separated from the grain 3 by insulation 4. However, embedded in the insulation 4 is a three layer element 5 composed of two electrically conductive layers 6 and 7 separated by a relatively nonconductive layer 7. Another conductive element 9 is embedded in the insulation near the shell 2 of the rocket. The conductive layers 6 and 7 of the element 5 and the conductive element 9 are all connected to a power source 10 such that the flow of current of resistance can be measured between conductive layers 6 and 7 by a sensing device 11 or between conductive layer 7 and conductive element 9 by a sensing device 12. Alternatively, the electric power supply 10 and the signal or sensing device 11 and 12 can be connected to the conductive layers 6 and 7 and the conductive element 9 in such a way as to measure difference in electrical potential or current flow or resistance between conductive layers 6 and 7 and between conductive layer 6 and conductive layer 9. Failure in a solid propellant rocket motor starts with the flame within the grain 3 coming in contact with the insulation 4 at the grain-insulation interface shown in FIG. 2 as the juncture of grain 3 with insulation layer 4c. Usually, the insulation chars, forming a tough skin. However, if the char layer is eroded by the flow of exhaust gases, the flame front will ultimately reach conductive layer 6 of element 5. As the flame front proceeds through conductive layer 6 and nonconductive layer 8, these layers are carbonized. In addition, the exhaust gases are at extremely high temperatures, i.e. 5,000 to 6,000°F., and at these temperatures are highly ionized and, consequently, electrically conductive. The combination of carbonization of layers 6 and 8 and the presence of the ionized gases greatly reduces the electrical resistance between layers 6 and 7. This change in resistance is detected by the signal device 11, which can either record this sudden change or trigger an alarm system or other mechanism as described above. Preferably, the sudden reduction in resistance or induced electrical potential or, conversely, the increase in the current flow merely gives a warning that there is a potential malfunction. If the insulation erosion continues, the flame front will ultimately reach conductive element 9, and the combination of carbonized insulation and hot ionized gases will provide an electrical path from the conductive layers of element 5 to the conductive element 9. Under these circumstances, the signal device 12 shows a reduction in induced electrical potential or in resistance, or conversely, an increase in current flow between conductive element 9 and conductive layer 6 or conductive layer 7, depending upon which of these is connected to the signal device 12, thereby indicating imminent failure of the rocket motor. The shell 2 is constructed of a special alloy which at temperatures above 300°F. tends to lose its structural strength and blows out under the pressures within the rocket motor. The relative locations of elements 5 and 9 as defined by the thickness of insulation layers 4a, 4b and 4c determine the time allowances in the warnings provided by signal devices 11 and 12.

Due to the strain put on the rocket motor by the stresses of temperature and pressure, it is very desirable that the insulation 4 and the elements 5 and 9 have an elongation capability sufficient to accommodate any local changes in configuration of the shell 2. With most currently used shell materials, this elongation should be in the range of about 10 percent. Preferably, they are all rubbery compositions. The preferred material for insulation 4 is a rubber filled with special chrysotile asbestos, as described more particularly in copending application Ser. No. 153,675, filed Nov. 20, 1961, by Walter A. Hartz and Daniel A Meyer and entitled "Elastomeric Composition for Use as Rocket Insulation" said application having been abandoned in favor of continuation-in-part application Ser. No. 519,195, filed Jan. 7, 1966. A preferred heat-curable composition for use in electrically conductive layers 6 and 7 and electrically conductive element 9 consists of:

| Ingredient: | Parts by weight |
| --- | --- |
| A butadiene-acrylonitrile rubber polymer | 98 |
| A conductive furnace carbon black | 50 |
| Dibeta-naphthyl-p-phenylene diamine (antioxidant) | 1.5 |
| A commercial cross-linking agent consisting of equal parts by weight of insoluble sulfur and a millable, non-staining styrene-butadiene rubber polymer | 4 |
| Stearic acid (process aid) | 2 |
| Zinc oxide (cure activator with the stearic acid) | 5 |
| Benzothiazyl disulfide (cure accelerator) | 1.5 |
| A coumarone-indene tackifying resin melting in the range of 100° C | 12.5 |
| Dioctyl phthalate (plasticizer) | 12.5 |

A preferred heat-curable composition for use in the nonconductive layer 8 consists of the same ingredients as those listed above except that a purer butadiene-acrylonitrile rubber polymer is substituted in the same amount and 55.6 parts by weight of a high purity silica filler is substituted for the 50 parts of carbon black. The volume resistivity of this nonconductive composition is approximately $10^9$ ohm centimeters higher than the volume resistivity of the above conductive composition.

Variations in the electrically conductive composition above are permissible. For example, electrically conductive metal powders or wires can be introduced in the composition in place of or together with the electrically conductive carbon filler. Alternatively, lengths of wire, either insulated or uninsulated, can be dispersed throughout the conductive layers 6 and 7 and conductive element 9. The use of a sufficient quantity of a conductive filler such as conductive carbon or metal powder dispersed throughout a conductive layer essentially guarantees electrical conductivity throughout the particular conductive layer. Similarly, variations are permissible in the composition of the nonconductive layer 8. It is only necessary that this layer be sufficiently nonconductive as to produce, for example, a detectable reduction in the resistance between conductive layers 6 and 7 when burn-through occurs. Due to the spurious signals which are generated during the burning and the noise level of the system, it is preferable with presently available signal devices that the difference in volume resistivity between the material used in the conductive layers and the nonconductive layer is at least $10^8$ ohm centimeters, and more preferably $10^{10}$ ohm centimeters. With such a volume resistivity difference burn-through will produce a substantial change in the resistance between conductive layers 6 and 7.

There can be more than one auxiliary conductive element like element 9, each wired to a separate signal device, or the element 9 can be omitted, if desired.

It is possible to operate under this invention without the use of a nonconductive layer 8 by using the insulation 4 as an electrically nonconductive layer between two conductive elements. For example, if in FIG. 2 element 5 consists only of conductive layer 7, it is still possible to measure current flow or resistance thereto and changes in that current flow or resistance with respect to element 9 as described above using signal device 12. In such a circumstance, insulation layer 4b acts as the nonconductive layer. While this insulation has a much lower volume resistivity than, for example, the composition preferred for nonconductive layer 8, the substantially greater thickness of insulation 4b gives the desired resistance.

In the illustrated embodiment, the shell 2, the grain 3, the insulation layers 4a, 4b and 4c and the elements 5 and 9 are concentric cylinders. If the grain is designed to burn radially, it is a hollowed-out cylinder; if the grain is designed for end-burning, it is a solid cylinder. However, the detection system can be employed successfully with these as well as other grain designs.

The shell 2 is a special high tensile alloy, but an epoxy-fiberglass shell can also be employed for solid propellant rocket motors and rockets.

Two different configurations of the detector have been fabricated and tested. One was a disc-shaped unit consisting of two conductive layers composed of the conductive rubber composition shown above separated by a nonconductive layer composed of the nonconductive rubber composition shown above. In order to minimize flow of the nonconductive layer during heat curing of the three layer element, the nonconductive layer was partially precured prior to incorporating it into the three layer element. The same effect can be realized by merely raising the viscosity of the composition to be employed in the dielectric layer. Brass electrodes molded into the two conductive layers were attached to a vacuum tube voltmeter designed to measure resistance between the two conductive layers. An oxyacetylene flame was directed to one conductive layer of the three layer elements. At first, there was a high resistance between the two conductive layers, but when burn-through occurred in the first conductive layer and in the nonconductive layer, the measured resistance dropped. A cylindrical element was similarly tested by passing burned propellant exhaust gases through the cylinder. The inner and outer conductive layers were attached to a signal device, e.g. a vacuum tube voltmeter, adjusted to measure resistance. Upon failure of the first conductive layer and of the intermediate nonconductive layer, the measured resistance between the inner and outer conductive layers dropped appreciably.

The essence of this invention resides in the use of conductive layers or elements separated by nonconductive continuous elements or layers which, upon burning through, become conducting continuous elements or layers. This has the effect of an infinite number of temperature sensors dispersed throughout the insulation 4 between the grain 3 and the shell 2. Several parallel electrical connections to each conductive layer allow for failure of any single connection. These connections are preferably made by curing the conductive layers or elements in contact with the electrical connecting leads. Separate detection systems can be used in conjunction with the same motor as one system at each head and a system for each or any part of the cylindrical section or all of it.

It will be understood that the above description is by way of illustration rather than limitation and that, in accordance with the provisions of the patent statutes, variations and modifications of the specific methods, compositions and articles described herein may be made without departing from the spirit of the invention.

I claim:

1. Apparatus for detecting thermal decomposition of a thermal insulation medium comprising:
   a thermal insulation medium;
   a source of thermal decomposition of said medium, said source and said medium being of such a nature that the path of decomposition through said medium is more electrically conductive than said medium prior to decomposition;
   a first means positioned uniformly within said medium with respect to said source, said first means being a rubbery composition which is more electrically conductive than said medium with respect to electrical conduction through said medium in a direction from said source to said first means;
   a second means positioned uniformly within said medium with respect to both said source and said first means, said second means being separate and more remote from said source than said first means, said second mans being a rubbery composition which is more electrically conductive than said medium with respect to electrical conduction through said medium in a direction from said first means to said second means;
   an electric power supply mans attached to said first and second means; and
   a means for the measurement of change in the rate of flow of electric current between said first means and said second means through said medium.

2. The apparatus of claim 1, wherein between said first means and said second means is positioned a relatively electrically nonconductive means, said nonconductive means being a rubbery composition having a volume resistivity of at least $10^8$ ohm centimeters greater than that of said first means and said second means.

3. The apparatus of claim 2 wherein said first means and said second means are separated only by said nonconductive means.

4. The apparatus of claim 3 containing:
   a third means positioned uniformly within said medium with respect to said source, said first means and said second means, said additional means being separate and more remote from said source than said second means, said third means being a rubbery composition which is more electrically conductive than said medium with respect to electrical conduction through said medium in a direction from said second means to said third means, said third means being attached to said electric power supply means; and
   a means for the measurement of change in the rate of flow of electric current between any two of said first, second and third means.

5. The apparatus of claim 1 wherein said source of thermal decomposition is a rocket motor propellant grain.

6. The apparatus of claim 1 wherein said thermal insulation medium is a cured elastomeric composition containing chrysotile asbestos fibers.

7. A machine comprising:
   a potential heat source;
   a structural means surrounding but not in contact with said heat source;
   a thermal insulation medium positioned uniformly between and in contact with both said heat source and said structural means, said medium being susceptible to thermal decomposition by said source when said source is ignited;
   a first rubbery means positioned uniformly within said medium with respect to said source, said first rubbery means being more electrically conductive than said medium with respect to electrical conduction through said medium in a direction from said source to said first rubbery means;
   a second rubbery means positioned uniformly within said medium with respect to both said source and said first rubbery means, said second rubbery means being separate and more remote from said source than said first rubbery means, said second rubbery means being more electrically conductive than said medium with respect to electrical conduction through said medium in a direction from said first rubbery means to said second rubbery means;
   an electrical power supply means attached to said first and second rubbery means; and
   a means for the measurement of change in the rate of flow of electric current between said first rubbery means and said second rubbery means through said medium.

8. The invention of claim 7 wherein said machine is a solid propellant rocket motor and the potential heat source is a rocket motor propellant grain.